Oct. 20, 1959     E. I. JANELID     2,909,335
RESILIENT AND BONDED DRUM LINING
Filed Aug. 3, 1954
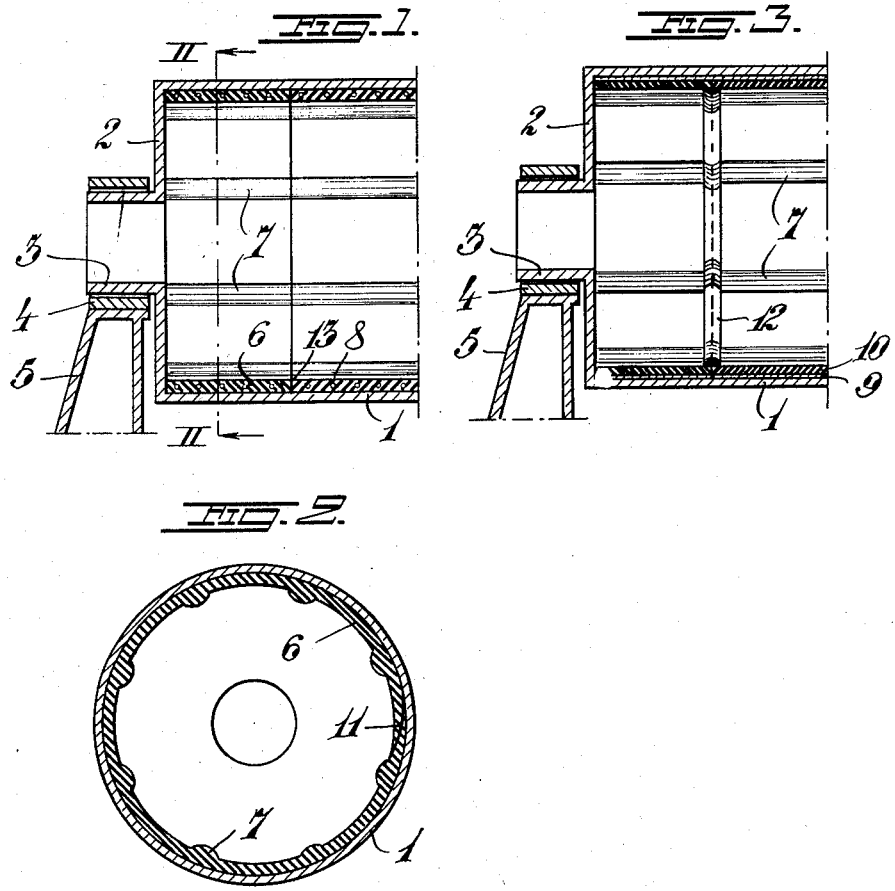
INVENTOR:
ERIK INGVAR JANELID, United States Patent Office 2,909,335
Patented Oct. 20, 1959

2,909,335

RESILIENT AND BONDED DRUM LINING

Erik Ingvar Janelid, Djursholm, Sweden, assignor to Trelleborgs Gummifabriks Aktiebolag, Trelleborg, Sweden, a corporation of Sweden Application August 3, 1954, Serial No. 447,462

Claims priority, application Sweden August 10, 1953

1 Claim. (Cl. 241—183)

This invention relates to improvements in the construction of linings for drums, especially rotatable drums for ball and tube mills.

The main object of the invention is to provide reliable lining of drums, which may be readily applied and replaced in shortest possible time and in which the use of fastening means, such as bolts, wedges or the like is entirely avoided. To this end the lining according to the invention comprises one or more adjacent cylindrical sections of wear resistant material, such as rubber, rubber coated metal, wear resistant steel or the like, each section consisting of a flexible, preferably resilient band, which after being joined together forms a continuous ring, said ring being given such peripheral dimensions or compressive stress that the lining is maintained in place by its inherent radial pressure against the circumferential inner wall of the drum.

Another object of the invention is to provide a lining, which may be obtained from a continuous web of a suitable wear resistant material, while one and the same web is capable of being used for preparing linings for drums of arbitrary sizes.

Still another object of the invention is to provide a lining, which although being of a large width consists of a single band.

In mills of said type, during the operation the interior of the drum is exposed to an intensive grinding effect and therefore, the interior of the drum or shell must be lined with a wear resistant material, preferably being exchangeable to permit the lining to be replaced when worn out.

Hitherto the linings consisted commonly of cast plates or rolled grates of wear resistant material, said plates or grates being secured to the shell by means of bolts, wedges or cement. In fastening the linings with bolts, the latter may either be inserted through holes in the lining plates themselves or through holes in separate fastening strips extending over the edges of adjacent plates.

Linings of rubber, bonded to the inner wall of the drum by vulcanization is also known.

However, the known linings have proved to include several drawbacks, for instance due to the fact that for each diameter of drum the metal plates or grates must be manufactured with an arcuate shape corresponding to the radius of said drum, wherefore many different sizes must be manufactured and kept in store. Fastening the separate lining plates with bolts has proved time wasting and diminishing of the strength and tightness of the drum, since the plates must be made of a relatively limited size and a large number of holes must be made in the mantle of the drum. Fastening the plates by cement has also proved unreliable as individual plates may loosen resulting in possible wrecking of the mill. To remove this last mentioned drawback large rubber plates are used, but these large plates were bonded to the shell by vulcanization. Although, said method is reliable it is troublesome and time wasting in lining and repairing.

The essential advantages of the invention is on one hand the fact that no fastening means such as bolts, wedges or the like, are necessary and that one is not constrained to manufacture special members for each size of drum, but the band may be produced and stored in continuous webs, from which suitable length may be cut when lining a particular drum. When repairing a lining being unequally worn out, only a portion including said destroyed grinding face need to be replaced by a band portion having its ends bonded to the remaining band, while urging the ends apart to produce said circumferential compressive stress.

Other objects and advantages of the present invention should be readily apparent by reference to the following specification considered in conjunction with the accompanying drawing forming a part thereof and it is to be understood that any modifications may be made in the structural details shown and described within the scope of the appended claims, without departing from the idea of the invention.

In the drawing:

Fig. 1 is a schematic fragmentary axial sectional view of a portion of a drum being lined in accordance with the invention, Fig. 2 is a transverse section along the line II—II of Fig. 1, and Fig. 3 is a view similar to that of Fig. 1 of another embodiment of the invention.

Referring now to Figs. 1 and 2 the drum or shell 1 of a tube mill is provided with end plates 2, each having a central outwardly projecting trunnion 3 supported in a bearing 4 mounted on a supporting pier 5. It is to be understood that the trunnion and bearing device may be realized in any suitable way and forms no part of the invention. The inner surface of the lining 6 is, as best seen in Fig. 2, provided with ridges 7. However the said inner surface of the lining may be shaped in different ways and present ridges of various shape. In this connection it is to be noted that the band itself may consist of articulated links. The bands 6 shown in Fig. 1 are preferably made of rubber having reinforcing elements, such as steel wires 8 embedded therein.

The linings according to the alternative embodiment seen in Fig. 3 consist of band shaped material of a steel web 9 coated with rubber 10.

As shown at 11 in Fig. 2 the ends of the bands 6 are obliquely cut. Said tapered end portions overlap each other and the joint therebetween may be carried out by vulcanizing or welding one end to the other, after having urged the ends in opposite sense in peripheral direction. The stress thus obtained in the band material has proved sufficient to hold the band in place and the band is pressed against the wall of the shell 1 due to its closed annular or continuous "arch"-shape.

Of course, it is also possible after determining the dimension of the band, which will be somewhat longer than the inner circumference of the shell, to join said ends before the band is inserted into the mill drum 1 and thereafter introduce the cylindrical lining element in the drum through a suitable manhole or through a suitable trunnion at one end of the drum.

The abutment between two adjacent parallel bands may suitably be covered by a separate annular strip 12 (Fig. 3) of the same material as the lining element or when using vulcanizable material, the side edges of adjacent bands 6 may be fused together as shown at 13 in Fig. 1.

It will be understood that the term "rubber" as used in this specification includes any rubber type material whether derived from natural or synthetic raw material having the necessary physical characteristics.

Although the foregoing specification and accompanying drawing disclose some preferred embodiments of the present invention, it is to be understood that it is not desired to be limited to said specific constructions, for obvious modifications will occur to a person skilled in the art.

What I claim is:

The combination with a tumbling drum, having an internal cylindrical surface, of a lining for said surface formed by a band-shaped piece cut from a continuous web of wear resistant resilient and pliable material to a length somewhat greater than that of the circumference of said surface, the cut ends of said band-shaped piece being bonded together to form an uninterrupted annular member, which dependent on its exceeding external circumferential dimension relative to the circumference of said surface will be in a state of peripheral compression pressing outwardly against said surface and maintaining itself in place in the drum, solely by its said outward pressure against said surface.

References Cited in the file of this patent

UNITED STATES PATENTS

| | | |
|---|---|---|
| 1,315,025 | Lawler | Sept. 2, 1919 |
| 1,601,956 | Gammeter | Oct. 5, 1926 |
| 1,919,366 | Haines | July 25, 1933 |
| 2,227,905 | Keenoy | Jan. 7, 1941 |
| 2,374,332 | Crawford | Apr. 24, 1945 |
| 2,476,505 | McIntyre | July 19, 1949 |

FOREIGN PATENTS

| | | |
|---|---|---|
| 206,456 | Great Britain | Nov. 8, 1923 |